(No Model.)
B. R. KIRKPATRICK.
HEDGE FENCE.
No. 509,812. Patented Nov. 28, 1893.
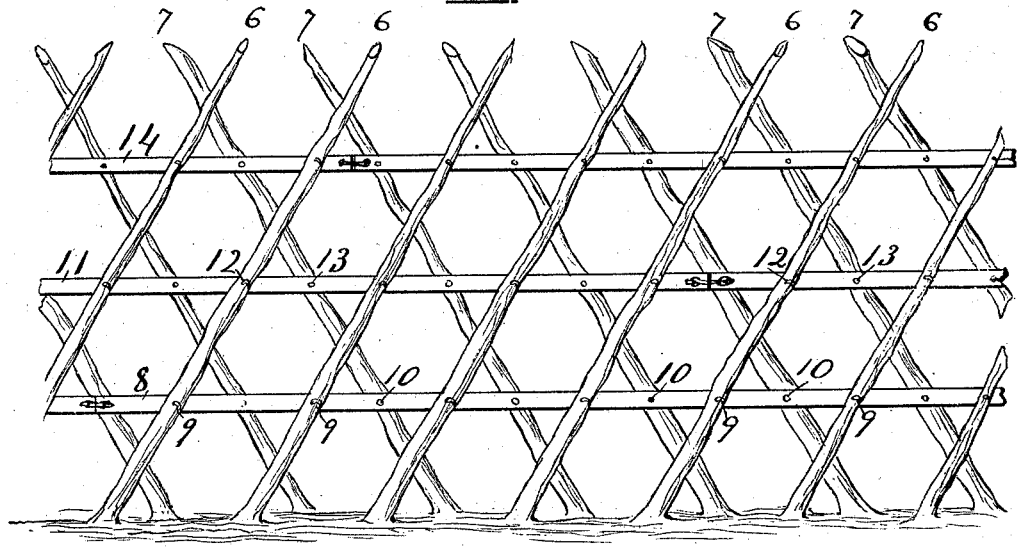
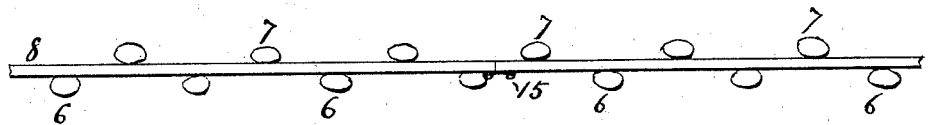
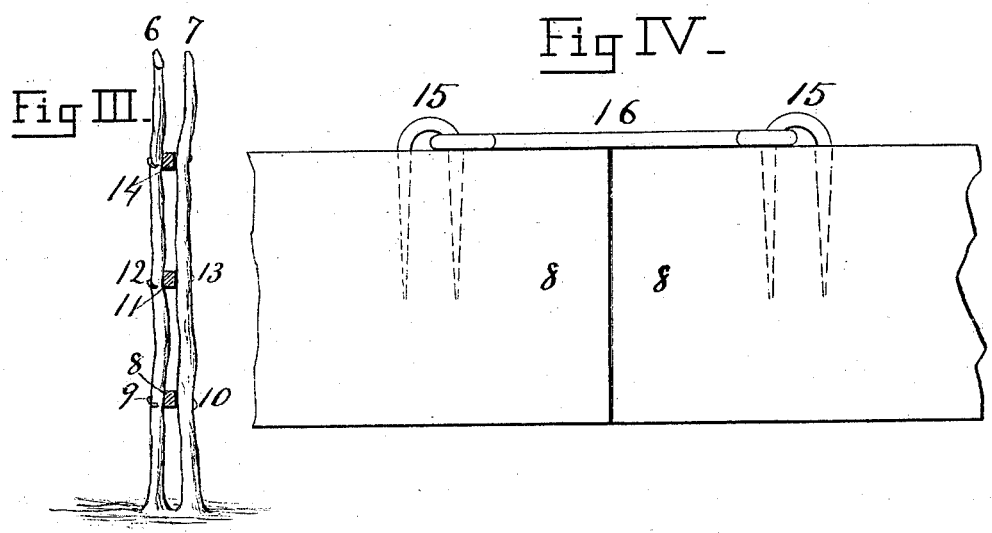
WITNESSES,
P. E. Stevens.
M. E. Hillyard.
INVENTOR.
Benjamin R. Kirkpatrick.
by W. L. Stevens. ATT'Y.

UNITED STATES PATENT OFFICE.

BENJAMIN R. KIRKPATRICK, OF HODGENSVILLE, KENTUCKY.

HEDGE FENCE.

SPECIFICATION forming part of Letters Patent No. 509,812, dated November 28, 1893.

Application filed June 17, 1893. Serial No. 477,994. (No model.)

*To all whom it may concern:*

Be it known that I, BENJAMIN R. KIRKPATRICK, a citizen of the United States, residing at Hodgensville, in the county of La Rue and State of Kentucky, have invented certain new and useful Improvements in Hedge Fences; and I do hereby declare the following to be a full, clear, and exact description of the invention, such as will enable others skilled in the art to which it appertains to make and use the same.

This invention relates to means for training hedge fences, and its object is to arrange and secure the bodies or stalks of the small trees of which the hedge is formed so as to imitate ornamental lattice work, and to make the hedge self-supporting so that cattle and other stock cannot break it down or rush through it.

To this end my invention consists in the construction and combination of parts forming a hedge fence, hereinafter described and claimed reference being had to the accompanying drawings, in which—

Figure I, is a side elevation of a hedge fence according to my invention. Fig. II, is a ground plan showing the location of the stalks in planting relative to a supporting rail. Fig. III, is a cross section representing the fence in end view, and Fig. IV, shows a rail joint on a larger scale.

In setting out young plants I fix them in two rows, which rows may be about four inches apart between centers and the plants may be located at any suitable distance, say at intervals of ten or twelve inches in each row, and the plants in one row should be located midway between the plants along the fence, of the other row. When the plants have taken root and are well grown I tip all the plants 6 in one row to a slant of about sixty degrees in one direction, and all the plants 7 in the other row to a slant of sixty degrees in the other direction.

8 is a rail having holes made in it spaced to correspond with the spaces between plants longitudinally of the fence, both rows being considered in this spacing. Through every other one of these holes I drive nails 9 into one row of stalks, and then through every other hole I drive nails 10 into the other row of stalks. These nails may be of wire and should be long enough to clinch in the form of a hook at the outside of the stalk. In a similar manner I locate a rail 11, half way up between the next two lines of crossings of the stalks above the first rail, the rail being spaced and having holes through it at similar even distances apart so that it may be nailed to the stalks at 12 and 13 in the same manner as the rail 8 was nailed to the stalks at 9 and 10, and when the stalks are long enough to require it I may add another rail 14 or even more rails in the same manner.

It will be seen that the larger openings formed by the stalks and rails are perfect hexagons in form, while the small openings are perfect equilateral triangles presenting a unique and pleasing appearance even before branches and leaves have grown to any extent upon the stalks, and the branches being comparatively light seem to rest like a net work upon a geometrical frame.

I provide each rail at both ends with a staple 15 and by means of wire loops or links 16 hooked into these staples I secure the rails together so that this hedge may be rapidly set up with no other tool than a common claw hammer, and the holes being evenly arranged in the rails, a rail may be used as a gage for setting the plants and it requires very little skill to secure the stalks so as to give the whole fence a perfectly symmetrical appearance. The rails may be of any suitable material, even common hoop iron answering the purpose though wooden rails are generally preferred. This method of training hedges is peculiarly well adapted to plants of the Osage orange variety, and by using small iron nails it has been found in actual practice that the plants seem to be wholly uninjured by the nail. It is better to use a nail in this manner than to use a staple fitting somewhat loosely around the plant, because the nail driven centrally through the plant permits the stalk to swell in any direction by natural growth while if the plant were surrounded by a staple it would eventually become bound and constricted thereby, to its material injury. Furthermore, the nails hold the plants so closely that they do not become chafed by being rubbed against their supports in the wind. A hedge fence thus formed is not only beautiful but in a very few years it grows to be perfectly impregnable to animals, the rails tending to keep each stalk in place and each stalk serving as a brace to the whole fence.

Having thus fully described my invention, what I believe to be new, and desire to secure by Letters Patent, is the following:

The combination in a hedge fence of a series of tree stalks planted alternately in two parallel rows at equal distances apart; the stalks of one row being tipped in one direction along the fence at angles of about sixty degrees and the stalks of the other row being tipped in the other direction along the fence at angles of sixty degrees, and rails located between the rows and half way between the crossings of the stalks and nailed to the stalks, substantially as described.

In testimony whereof I affix my signature in presence of two witnesses.

BENJAMIN R. KIRKPATRICK.

Witnesses:
WM. MILLER,
T. B. KIRKPATRICK.